United States Patent
Sesum et al.

(10) Patent No.: US 9,946,690 B2
(45) Date of Patent: Apr. 17, 2018

(54) PARAGRAPH ALIGNMENT DETECTION AND REGION-BASED SECTION RECONSTRUCTION

(75) Inventors: Milan Sesum, Belgrade (RS); Milos Lazarevic, Nis (RS); Milos Raskovic, Belgrade (RS); Aljosa Obuljen, New Belgrade (RS); Filip Panjevic, Belgrade (RS); Vanja Petrovic Tankovic, Sombor (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 350 days.

(21) Appl. No.: 13/704,172

(22) PCT Filed: Jul. 6, 2012

(86) PCT No.: PCT/EP2012/002865
§ 371 (c)(1),
(2), (4) Date: Sep. 10, 2013

(87) PCT Pub. No.: WO2014/005609
PCT Pub. Date: Jan. 9, 2014

(65) Prior Publication Data
US 2014/0013215 A1     Jan. 9, 2014

(51) Int. Cl.
*G06F 17/00* (2006.01)
*G06F 17/21* (2006.01)
*G06K 9/00* (2006.01)

(52) U.S. Cl.
CPC ....... *G06F 17/212* (2013.01); *G06K 9/00463* (2013.01)

(58) Field of Classification Search
CPC .............................. G06F 17/21; G06F 17/212
(Continued)

(56) References Cited

U.S. PATENT DOCUMENTS

| 4,813,010 A | 3/1989 | Okamoto et al. |
| 4,876,665 A | 10/1989 | Iwai et al. |

(Continued)

FOREIGN PATENT DOCUMENTS

| EP | 1107169 A2 | 6/2001 |
| EP | 1679625 A2 | 7/2006 |
| WO | 2007070010 | 8/2007 |

OTHER PUBLICATIONS

Flow Document Overview, http://msdn.microsoft.com/en-us/library/aa970909.aspx, pp. 1-19 (Mar. 15, 2012).

(Continued)

*Primary Examiner* — Stephen Hong
*Assistant Examiner* — Matthew Ludwig
(74) *Attorney, Agent, or Firm* — Merchant & Gould P.C.

(57) ABSTRACT

A paragraph alignment detection engine and a section reconstruction engine. The paragraph alignment detection engine determines the paragraph alignment of a paragraph and updates the paragraph alignment property of the paragraph in the data store for single line and multi-line paragraphs. The paragraph alignment detection engine employs per paragraph comparisons and relative comparisons to other paragraphs to determine the paragraph alignment of a single line paragraph. The paragraph alignment detection engine employs per paragraph comparisons and relative comparisons of the lines of a paragraph to determine the paragraph alignment of a multi-line paragraph. The section reconstruction engine minimizes the number of sections created in the flow format document by identifying the columns on each page, combining contiguous pages with the same column layout into a single section, and creating alternative objects to contain regions associated special cases in lieu of creating additional sections.

10 Claims, 13 Drawing Sheets

(58) Field of Classification Search
USPC .................... 715/243, 249, 256, 247, 253
See application file for complete search history.

(56) References Cited

U.S. PATENT DOCUMENTS

| | | | |
|---|---|---|---|
| 5,033,008 | A | 7/1991 | Barker et al. |
| 5,774,580 | A | 6/1998 | Saitoh |
| 5,848,184 | A * | 12/1998 | Taylor ............... G06K 9/00463 382/173 |
| 5,907,631 | A | 5/1999 | Saitoh |
| 6,298,357 | B1 | 10/2001 | Wexler et al. |
| 6,336,124 | B1 | 1/2002 | Alam et al. |
| 6,694,053 | B1 | 2/2004 | Burns et al. |
| 6,760,887 | B1 | 7/2004 | Taieb |
| 7,370,274 | B1 | 5/2008 | Stuple et al. |
| 7,555,711 | B2 * | 6/2009 | Chao ................... G06F 17/211 715/243 |
| 7,603,351 | B2 | 10/2009 | Mansfield et al. |
| 7,689,037 | B2 | 3/2010 | Handley et al. |
| 7,698,627 | B2 | 4/2010 | Asakawa et al. |
| 7,827,484 | B2 | 11/2010 | Djean et al. |
| 7,899,826 | B2 | 3/2011 | Mansfield et al. |
| 8,023,738 | B1 | 9/2011 | Goodwin et al. |
| 8,208,726 | B2 | 6/2012 | Eshghi et al. |
| 8,249,344 | B2 | 8/2012 | Viola et al. |
| 8,260,049 | B2 | 9/2012 | Deryagin et al. |
| 8,261,186 | B2 | 9/2012 | Mansfield et al. |
| 8,311,330 | B2 | 11/2012 | Prabhakara et al. |
| 8,438,472 | B2 * | 5/2013 | Mansfield ............ G06F 17/211 715/234 |
| 8,473,467 | B2 | 6/2013 | Levy et al. |
| 8,942,489 | B2 | 1/2015 | Sesum et al. |
| 9,098,581 | B2 * | 8/2015 | Yacoub ............... G06K 9/00463 |
| 9,330,070 | B2 | 5/2016 | Zaric et al. |
| 2004/0194035 | A1 | 9/2004 | Chakraborty |
| 2004/0210818 | A1 | 10/2004 | Jones et al. |
| 2005/0114405 | A1 | 5/2005 | Lo |
| 2006/0010375 | A1 | 1/2006 | Salesin et al. |
| 2006/0271847 | A1 | 11/2006 | Meunier |
| 2007/0074108 | A1 | 3/2007 | Xie et al. |
| 2007/0116362 | A1 | 5/2007 | Tiede |
| 2007/0192687 | A1 | 8/2007 | Simard et al. |
| 2007/0195095 | A1 | 8/2007 | Gerhard et al. |
| 2008/0107338 | A1 | 5/2008 | Furmaniak et al. |
| 2009/0087094 | A1 | 4/2009 | Deryagin et al. |
| 2009/0265339 | A1 | 10/2009 | Chen et al. |
| 2009/0327285 | A1 | 12/2009 | Mansfield et al. |
| 2010/0174732 | A1 | 7/2010 | Levy et al. |
| 2010/0174980 | A1 * | 7/2010 | Mansfield ............ G06F 17/211 715/234 |
| 2010/0306260 | A1 | 12/2010 | Dejean |
| 2011/0222773 | A1 * | 9/2011 | Radakovic ......... G06K 9/00469 382/182 |
| 2012/0078612 | A1 | 3/2012 | Kandekar |
| 2012/0102388 | A1 | 4/2012 | Fan |
| 2012/0330944 | A1 | 12/2012 | Vailaya et al. |
| 2013/0188875 | A1 | 7/2013 | Sesum et al. |
| 2013/0191366 | A1 | 7/2013 | Jovanovic et al. |
| 2013/0191389 | A1 | 7/2013 | Lazarevic et al. |
| 2013/0191715 | A1 | 7/2013 | Raskovic et al. |
| 2013/0191732 | A1 | 7/2013 | Lazarevic et al. |
| 2013/0205200 | A1 | 8/2013 | Lazarevic et al. |
| 2013/0205202 | A1 | 8/2013 | Xiao et al. |
| 2014/0250361 | A1 | 9/2014 | Wineman et al. |
| 2014/0257789 | A1 | 9/2014 | Zaric et al. |
| 2014/0258852 | A1 | 9/2014 | Sesum et al. |
| 2014/0301644 | A1 * | 10/2014 | Koh ................... G06K 9/00469 382/175 |
| 2015/0121201 | A1 | 4/2015 | Sheldon et al. |
| 2015/0135047 | A1 | 5/2015 | Sesum et al. |
| 2015/0149893 | A1 | 5/2015 | Lukic |
| 2016/0092404 | A1 | 3/2016 | Farouki et al. |
| 2016/0246774 | A1 | 8/2016 | Zaric et al. |

OTHER PUBLICATIONS

Hassan, T., "PDF to HTML Conversion," CS310: Third Year Project Mar. 2002, University of Warwick, http://www.dbai.tuwien.ac.at/staff/hassan/pdf2html/final.pdf, 56 pages (2003-2003).

QTextEdit Class Reference, http://doc.qt.nokia.com/4.8-snapshot/qtextedit.html, pp. 1-27 (Mar. 15, 2012).

Sporleder, C. et al., "Broad Coverage Paragraph Segmentation across Languages and Domains," ACM Transactions on Speech and Language Processing (TSLP), vol. 3, No. 2, pp. 1-35 (Jul. 2006).

Hassan, T. et al., "Table Recognition and Understanding from PDF Files," *Ninth International Conference on Document Analysis and Recognition* (*ICDAR*), 6 pages (2007).

International Search Report and Written Opinion for PCT/EP2012/002865 dated Apr. 4, 2013.

Liang, J. et al., "Document Layout Structure Extraction Using Bounding Boxes of Different Entities," *Proceedings of the 3rd IEEE Workshop on Applications of Computer Vision* (*WACV '96*), pp. 278-283 (1996).

Poirier, B. et al., "An Interactive System to Extract Structured Text from a Geometrical Representation," *Proceedings of the 4th International Conference on Document Analysis and Recognition* (*ICDAR*), pp. 342-346 (1997).

Rus, D. et al., "Using White Space for Automated Document Structuring," *Technical Report TR 94-1452*, Cornell University, Department of Computer Science, pp. 1-33 (Jul. 30, 1994).

"PDF to Word", http://www.pdftoword.com/, Jan. 4, 2012, 3 pages.

avs4you.com, "How to convert PDF to DOCX format?", http://www.avs4you.com/guides/convert-pdf-docx.aspx, Jan. 4, 2012, 7 pages.

Chen et al., "Integrating Geometrical and Linguistic Analysis for Email Signature Block Parsins", ACM Transactions on Information Systems, New York, US, Oct. 1, 1999, pp. 343-366.

investintech.com, "Fast, Accurate PDF to Word Conversions", http://www.investintech.com/prod_a2d.htm, Jan. 5, 2012, 3 pages.

Kieninger et al., "The T-Recs Table Recognition and Analysis System", Lecture Notes in Computer Science/Computational Science, vol. 1655, Jan. 1, 1999, pp. 255-269.

PCT International Preliminary Report on Patentability in PCT/EP2012/0002865, dated Jan. 6, 2015, 8 pages.

pdfconverter.com, "How to Convert PDF to DOCX", http://www.pdfconverter.com/resources/pdftips/howtoconvertpdftodocx, Jan. 4, 2012, 2 pages.

Zanibbi et al., "A Survey of Table Recognition Models, Observations, Transformations and Inferences", International Journal on Document Analysis and Recognition, vol. 7, No. 1, Sep. 1, 2004, 16 pages.

Zuyev, "Table Image segmentation", Institute of Electrical and Electronics Engineers, Proceedings of the 4th International Conference on Document Analysis and Recognition, ICDAR, Aug. 78, 1997, pp. 705-708.

* cited by examiner

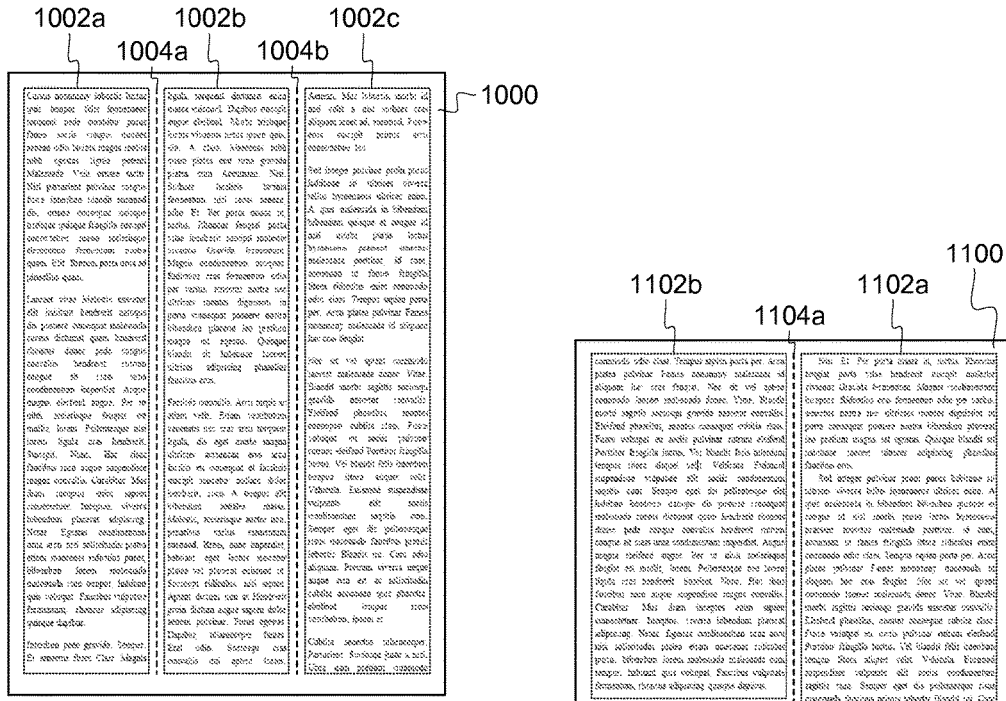
Fig. 10
Fig. 11
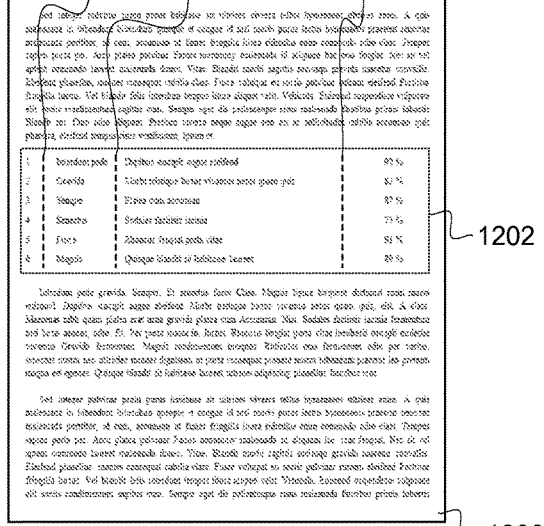
Fig. 12

PARAGRAPH ALIGNMENT DETECTION AND REGION-BASED SECTION RECONSTRUCTION

BACKGROUND

Flow format documents and fixed format documents are widely used and have different purposes. Flow format documents organize a document using complex logical formatting objects such as sections, paragraphs, columns, and tables. As a result, flow format documents offer flexibility and easy modification making them suitable for tasks involving documents that are frequently updated or subject to significant editing. In contrast, fixed format documents organize a document using basic physical layout elements such as text runs, paths, and images to preserve the appearance of the original. Fixed format documents offer consistent and precise format layout making them suitable for tasks involving documents that are not frequently or extensively changed or where uniformity is desired. Examples of such tasks include document archival, high-quality reproduction, and source files for commercial publishing and printing. Fixed format documents are often created from flow format source documents. Fixed format documents also include digital reproductions (e.g., scans and photos) of physical (i.e., paper) documents.

In situations where editing of a fixed format document is desired but the flow format source document is not available, the fixed format document must be converted into a flow format document. Conversion involves parsing the fixed format document and transforming the basic physical layout elements from the fixed format document into the more complex logical elements used in a flow format document. Existing document converters faced with complex elements resort to less common techniques and awkward techniques, such as the indiscriminate use of section breaks, designed to preserve visual fidelity of the layout of the fixed format document (e.g., text frames, line spacing, character spacing, and images) at the expense of the flowability of the output document. The result is a limited flow format document that requires the user to perform substantial manual reconstruction to have a truly useful flow format document. It is with respect to these and other considerations that the present invention has been made.

BRIEF SUMMARY

The following Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

The paragraph alignment detection method begins with the trimming operation which trims excess spaces at the start and the end of each line in the paragraph. The operations used to determine paragraph alignment differ based on the number of lines in the paragraph. A single line paragraph is analyzed differently from a multi-line paragraph. If the paragraph has a single line, the paragraph alignment detection method performs single line paragraph alignment analysis. For a paragraph with more than one line, the paragraph alignment detection method performs multi-line paragraph alignment analysis. Once paragraph alignment has been determined, the data store update operation updates the data store to identify the paragraph alignment of the paragraphs (e.g., updates the alignment property of the paragraph object).

The single line paragraph alignment analysis process begins by finding the bounding box of the single line paragraph. A margin comparison operation compares the left extent of the bounding box and the right extent of the bounding box to the corresponding page margin. If the positions of the left and right edges are substantially equal to corresponding page margin, the paragraph alignment is determined to be justified. If the positions of either (or both) the left and right edges differ substantially from the corresponding page margin, the number of paragraphs, other than the paragraph being analyzed, appearing on the page (or other grouping) are counted. If sufficient paragraphs exist for a meaningful comparison, the single line paragraph alignment analysis performs the relative analysis process that bases paragraph alignment on a comparison of the characteristics of the single line paragraph to the characteristics of other paragraphs. Otherwise, the single line paragraph alignment analysis performs the independent analysis process based solely on characteristics of the single line paragraph being analyzed. Following the completion of the relative analysis process and/or independent analysis process, the result of the single line paragraph alignment determination is used to update the data store.

The relative analysis process begins by trimming the lines of the other paragraphs on the same page as the single line paragraph and finding their left edges (or bounding boxes). Next, the position of the left edge of the single line paragraph bounding box is compared to the positions of the left edges of the other paragraphs. If the position of the left edge of the single line paragraph is substantially equal to the positions the left edges of the other paragraphs, the paragraph alignment is determined to be left aligned. If the position of the left edge of the single line paragraph differs substantially from the positions of the left edges of the other paragraphs, the single line paragraph alignment analysis falls back to the independent analysis process.

The independent analysis process compares the left indentation of the single line paragraph to the right indentation of the single line paragraph. If the left and right indentations of the single line paragraph are substantially equal, the paragraph alignment is determined to be centered. If the left indentation of the single line paragraph is greater than the right indentation of the single line paragraph, the paragraph alignment is determined to be right aligned. Otherwise, the paragraph alignment is determined to be left aligned.

The multi-line paragraph alignment analysis includes a differential indentation analysis, a word spacing analysis, an indentation variance analysis, an average indentation analysis, and a confidence-based paragraph alignment determination. The multi-line paragraph alignment analysis uses selected characteristics or values based on selected characteristics in the various analysis stages. First, the differential indentation of the full lines of the paragraph and the differential indentation of the last line of the paragraph are calculated. The value of the differential indentation is used to adjust one of the left alignment confidence value, the right alignment confidence value, or the centered and justified alignment confidence values. Next, the differential indentation of the paragraph is compared to the differential indentation of the last line. The result of the comparison is used to adjust one of the centered and justified confidence values or the left and right alignment confidence values. The word spacing analysis process begins by calculating and/or determining one or more values related to the distance between words, such as a composite word spacing value and a reference value. The composite word spacing is compared to the reference value. The result of the comparison is used to adjust either the justified confidence value or the left alignment, right alignment, and centered confidence values. The indentation variance analysis process begins by calculating the left indentation variance value and the right indentation variance value. The left and right indentation variance values are compared. The result of the comparison is used to adjust either the left alignment confidence value or the right alignment confidence value. The average indentation analysis process begins by calculating the average left indentation and the average right indentation of the lines in the paragraph. The average left and right indentation values are compared. The result of the comparison is used to adjust either the left alignment confidence value or the right alignment confidence value. At the conclusion of the characteristic analysis stages, the confidence-based paragraph alignment determination operation determines the paragraph alignment for the paragraph based on the highest paragraph alignment confidence value. The result of the multi-line paragraph alignment analysis is used to update the data store.

The section reconstruction engine executes the region-based section reconstruction method. The region-based section reconstruction method considers any location where the column layout changes as potentially starting a new section. Accordingly, the region-based section reconstruction method begins identifying regions on page that have vertical overlap as column candidates. Column detection continues by finding the lengths of the vertical separators between the column candidates. If the difference between the largest vertical separator length and the length of a vertical separator exceeds a selected threshold, that vertical separator is not considered a column separator and the vertically overlapping regions are discarded from the column candidates. Once columns are detected for a page, the section reconstruction engine analyzes the column candidates for special cases in order to reduce or minimize the number of sections in the document. Special cases that are discarded as column candidates include, but are not limited to, borderless tables, a minor inconsistent column layout intersecting the dominant column layout on a single page or interrupting the dominant column layout shared between consecutive pages in a document, and introductory information preceding the dominant column layout of the page or section. After the sections have been reconstructed, the region-based section reconstruction method updates the data store to identify the sections (e.g., creates section objects or other logical layout objects for the sections).

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

FIG. 10 graphically illustrates the column detection process applied to a page of a document;

FIG. 11 graphically illustrates the column detection process applied to a page of a document where columns are discarded;

FIG. 12 illustrates an example of the special case of a borderless table.

DETAILED DESCRIPTION

One or more embodiments of a paragraph alignment detection engine and a section reconstruction engine are described herein and illustrated in the accompanying figures. Other features and advantages will be apparent from reading this detailed description and reviewing the associated figures. This detailed description is exemplary of the general inventive concept and should not be used to limit the general inventive concept or the invention as claimed. The paragraph alignment detection engine determines the paragraph alignment of a paragraph and updates the paragraph alignment property of the paragraph in the data store for single line and multi-line paragraphs. The paragraph alignment detection engine employs per paragraph comparisons and relative comparisons to other paragraphs to determine the paragraph alignment of a single line paragraph. The paragraph alignment detection engine employs per paragraph comparisons and relative comparisons of the lines of a paragraph to determine the paragraph alignment of a multi-line paragraph. The section reconstruction engine minimizes the number of sections created in the flow format document by identifying the columns on each page, combining contiguous pages with the same column layout into a single section, and creating alternative objects to contain regions associated special cases in lieu of creating additional sections.

Figure 1:
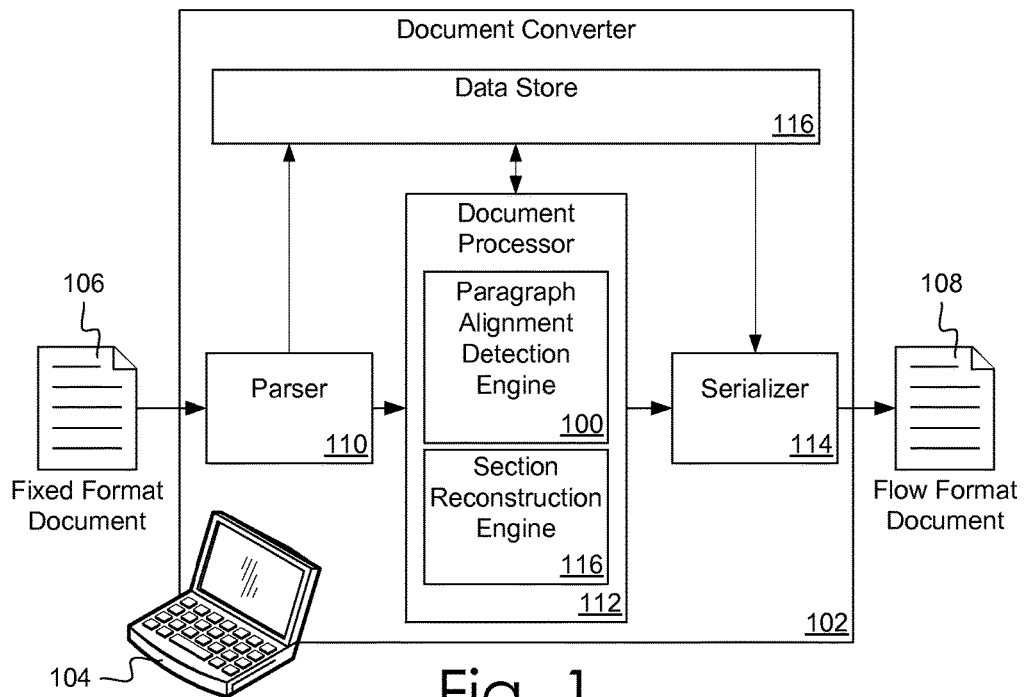
FIG. 1 is a block diagram of one embodiment of a system including the paragraph alignment detection engine and the section reconstruction engine.

FIG. 1 illustrates one embodiment of a system incorporating the paragraph alignment detection engine 100 and the section reconstruction engine 118. In the illustrated embodiment, the paragraph alignment detection engine 100 and the section reconstruction engine 118 operate as part of a document converter 102 executed on a computing device 104. The document converter 102 converts a fixed format document 106 into a flow format document 108 using a parser 110, a document processor 112, and a serializer 114. The parser 110 reads and extracts data from the fixed format document 106. The data extracted from the fixed format document is written to a data store 116 accessible by the document processor 112 and the serializer 114. The document processor 112 analyzes and transforms the data into flowable elements using one or more detection and/or reconstruction engines (e.g., the paragraph alignment detection engine 100 or the section reconstruction engine 118 described herein). Finally, the serializer 114 writes the flowable elements into a flowable document format (e.g., a word processing format).

Figure 2:
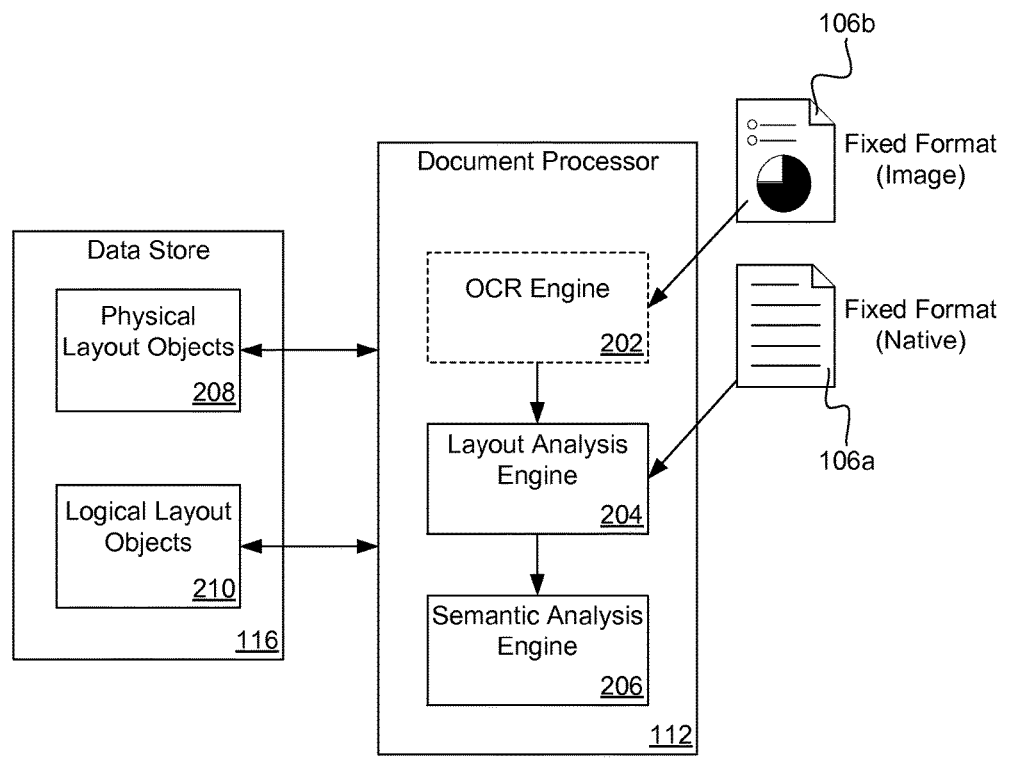
FIG. 2 is a block diagram showing the operational flow of one embodiment of the document processor.

FIG. 2 illustrates one embodiment of the operational flow of the document processor 112 in greater detail. The document processor 112 includes an optional optical character recognition (OCR) engine 162, a layout analysis engine 164, and a semantic analysis engine 166. The data contained in the data store 116 includes physical layout objects 168 and logical layout objects 170. In some embodiments, the physical layout objects 168 and logical layout objects 170 are hierarchically arranged in a tree-like array of groups (i.e., data objects). In various embodiments, a page is the top level group for the physical layout objects 168, while a section is the top level group for the logical layout objects 170. The data extracted from the fixed format document 106 is generally stored as physical layout objects 168 organized by the containing page in the fixed format document 106. The basic physical layout objects include text-runs, images, and paths. Text-runs are the text elements in page content streams specifying the positions where characters are drawn when displaying the fixed format document. Images are the raster images (i.e., pictures) stored in the fixed format document 106. Paths describe elements such as lines, curves (e.g., cubic Bezier curves), and text outlines used to construct vector graphics. Logical data objects include flowable elements such as sections, paragraphs, columns, and tables.

Where processing begins depends on the type of fixed format document 106 being parsed. A native fixed format document 106a created directly from a flow format source document contains the some or all of the basic physical layout elements. Generally, the data extracted from a native fixed format document. The embedded data objects are extracted by the parser and are available for immediate use by the document converter; although, in some instances, minor reformatting or other minor processor is applied to organize or standardize the data. In contrast, all information in an image-based fixed format document 106b created by digitally imaging a physical document (e.g., scanning or photographing) is stored as a series of page images with no additional data (i.e., no text-runs or paths). In this case, the optional optical character recognition engine 162 analyzes each page image and creates corresponding physical layout objects. Once the physical layout objects 168 are available, the layout analysis engine 164 analyzes the layout of the fixed format document. After layout analysis is complete, the semantic analysis engine 166 enriches the logical layout objects with semantic information obtained from analysis of the physical layout objects and/or logical layout objects.

Figure 3:
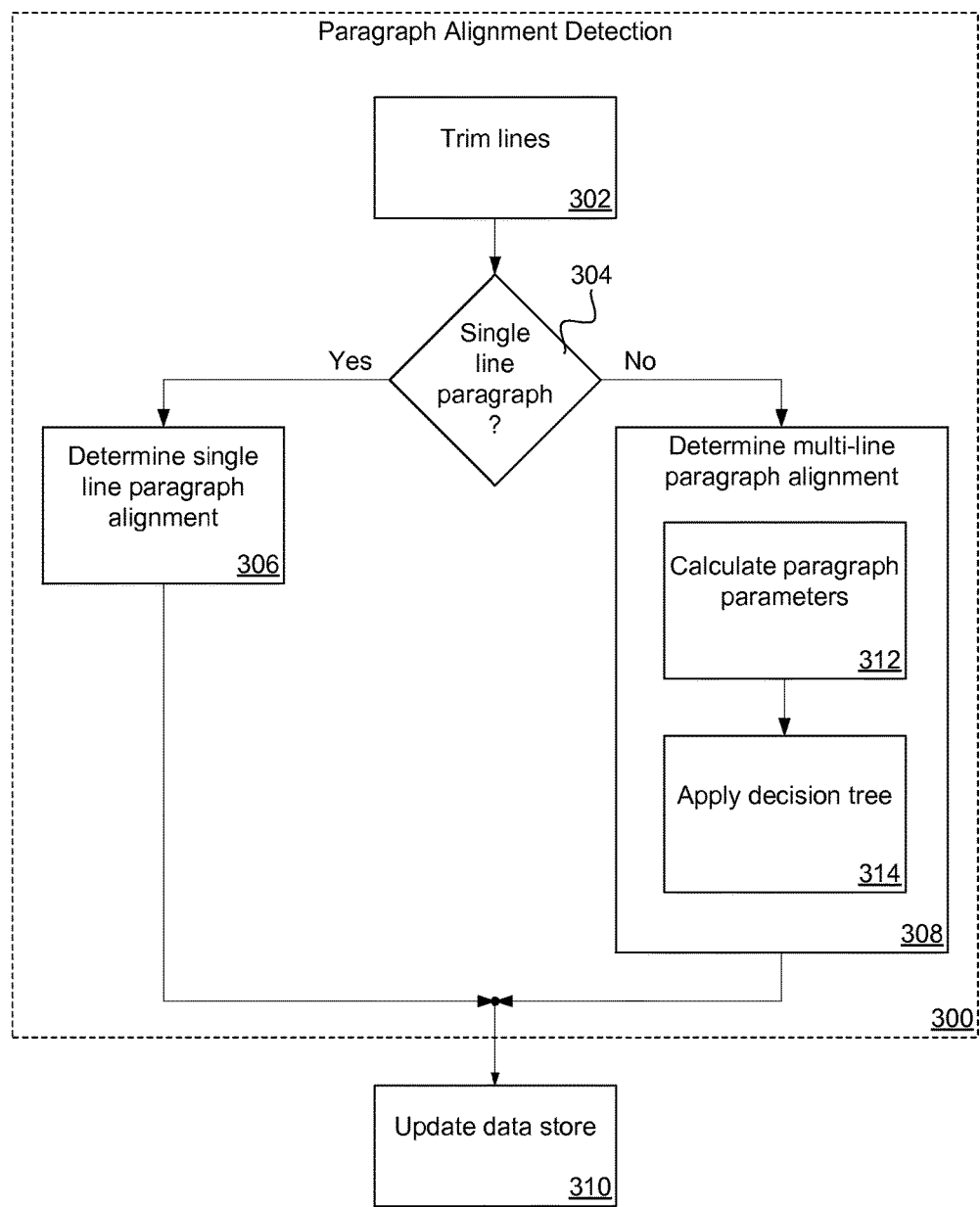
FIG. 3 is a flow chart showing one embodiment of the paragraph alignment detection method performed by the paragraph alignment detection engine.

FIG. 3 is a flow chart showing one embodiment of the paragraph alignment detection method 300 performed by the paragraph alignment detection engine 100. Generally, the paragraph alignment detection method 300 operates on a single paragraph at a time. In various embodiments, other paragraphs are simultaneously analyzed for comparison purposes. In some embodiments, paragraph alignment may be determined simultaneously for multiple paragraphs undergoing comparison that have the same characteristics. Further, the paragraph alignment detection method 300 is generally a per page operation (i.e., analyzing the paragraphs on a single page); however, other analysis groupings may be used.

The paragraph alignment detection method 300 depends on the availability of certain information (i.e., physical and logical layout objects) about the data obtained from the fixed format document. In various embodiments, the paragraph alignment detection engine 100 is part of a pipeline in the document converter 102 that includes one or more other engines that operate to convert the raw elements obtained from the fixed format document into the physical and logical layout elements associated with the flow format document. The data processing operations performed by the document converter 102 prior to executing the paragraph alignment detection engine 100 include, but are not limited to, detecting paragraphs, detecting lines in paragraphs, and detecting words in a line. In various embodiments, the operations may also include, but are not limited to, some or all of detecting cross-region paragraphs, detecting cross-line words, and detecting fonts in a paragraph.

Because fixed format documents attempt to preserve visual fidelity, the data obtained from a fixed format document often includes undesirable placeholders. An example of particular relevance to the paragraph alignment detection method 300 is the padding of lines of text with spaces (i.e., spaces, tabs, etc.) used solely for the purpose of controlling the placement of the text. When the data is obtained from the fixed format document, these extra spaces are actual characters that are converted as a part of the text runs. Such extra spaces are undesirable in the flow format document and potentially adversely affect paragraph alignment detection by improperly increasing the width of the padded line and paragraph including the padded line. Accordingly, the paragraph alignment detection method 300 begins with the trimming operation 302 which trims excess spaces at the start and the end of each line in the paragraph.

The operations used to determine paragraph alignment differ based on the number of lines in the paragraph. A single line paragraph is analyzed differently from a multi-line paragraph. Accordingly, an analysis mode branching operation 304 selects one of two different analysis modes based on the number of lines in the paragraph. If the paragraph has a single line, the paragraph alignment detection method 300 performs single line paragraph alignment analysis 306. For a paragraph with more than one line, the paragraph alignment detection method 300 performs multi-line paragraph alignment analysis 308. Once paragraph alignment has been determined, the data store update operation 310 updates the alignment property of the paragraph object in the data store.

Figure 4:
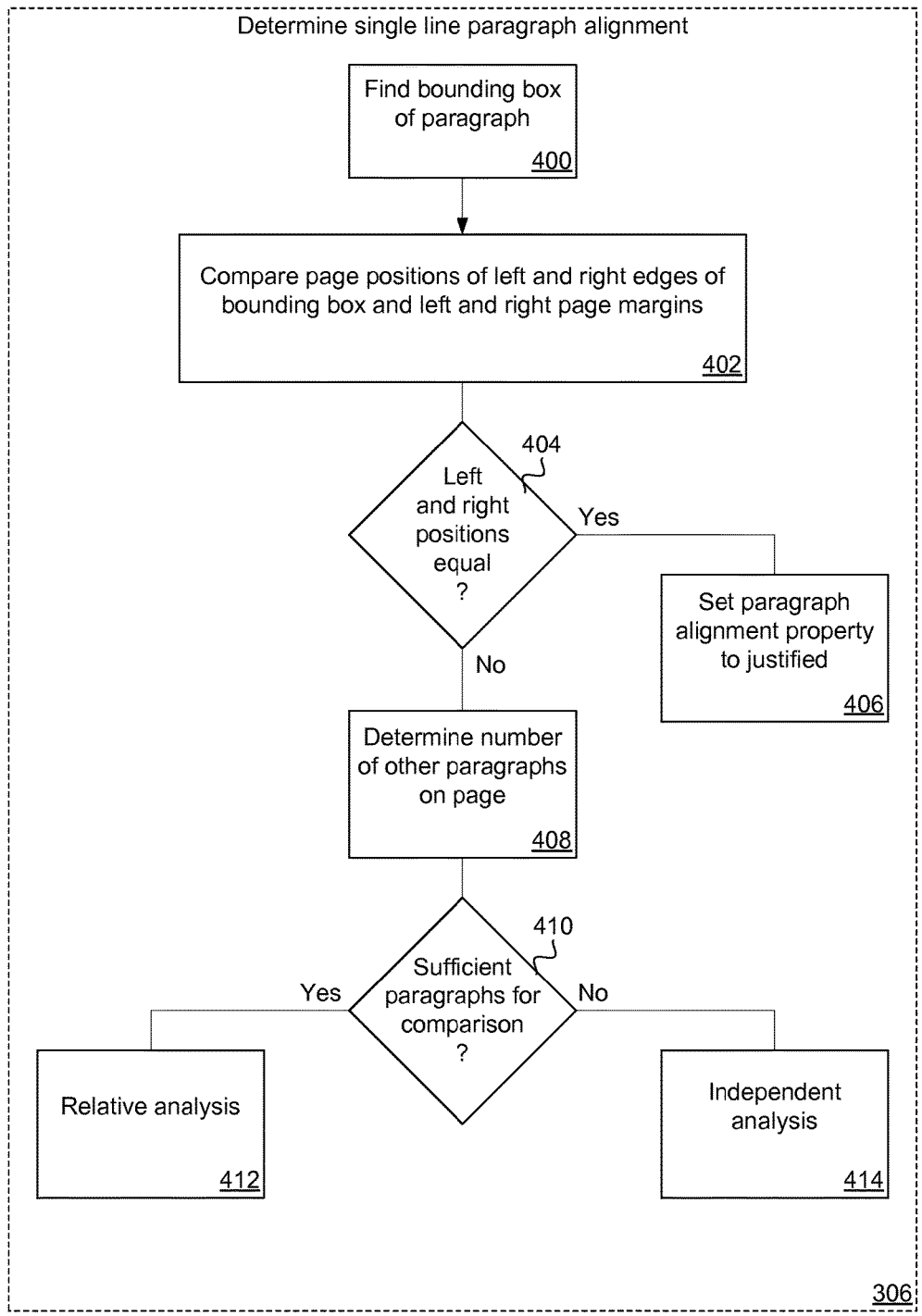
FIG. 4 is a flow chart of one embodiment of the single line paragraph alignment analysis process.

FIG. 4 is a flow chart of one embodiment of the single line paragraph alignment analysis process 306. First, a bounding box determination operation 400 finds the bounding box (or left and right edges) of the single line paragraph. For accurate paragraph alignment detection, it is generally desirable to find the smallest bounding box that contains all of the visible characters of the text object (e.g., paragraph, line, or word), hence, the value of the trimming operation 302 is apparent. Next, a margin comparison operation 402 compares the extents of the bounding box to the page margins. In various embodiments, the comparisons are made using page coordinate values; however, other comparisons may be used.

More specifically, the margin comparison operation 402 compares the position (e.g., x coordinate) of the left edge of the bounding box to the position of the left page margin and compares the position of the right edge of the bounding box to the position of the right page margin. The margin decision operation 404 branches the analysis based on the results of the margin comparison operation 402. If the positions of the left and right edges are substantially equal to corresponding page margin, the paragraph alignment is determined to be justified (i.e., full justification) 406. If the positions of either (or both) the left and right edges differ substantially from the corresponding page margin, the single line paragraph alignment analysis 306 continues with a paragraph counting operation 408 that determines the number of paragraphs, other than the paragraph being analyzed, appearing on the page (or other grouping). The paragraph count decision operation 410 branches the analysis based on the results of the paragraph counting operation 408. If sufficient paragraphs exist for a meaningful comparison, the single line paragraph alignment analysis 306 performs the relative analysis process 412 that bases paragraph alignment on a comparison of the characteristics of the single line paragraph to the characteristics of other paragraphs. Otherwise, the single line paragraph alignment analysis 306 performs the independent analysis process 414 based solely on characteristics of the single line paragraph being analyzed. In general, when sufficient comparatives are available, the relative analysis process 412 offers a higher confidence in the accuracy of the detected paragraph alignment that justifies the extra processing involved. Accordingly, in various embodiments, the threshold number of paragraphs needed for meaningful comparison is determined based on balancing the amount of processing with the increase in confidence obtained. In some embodiments, the relative analysis process 412 is used if even a single additional paragraph is available.

Figure 5:
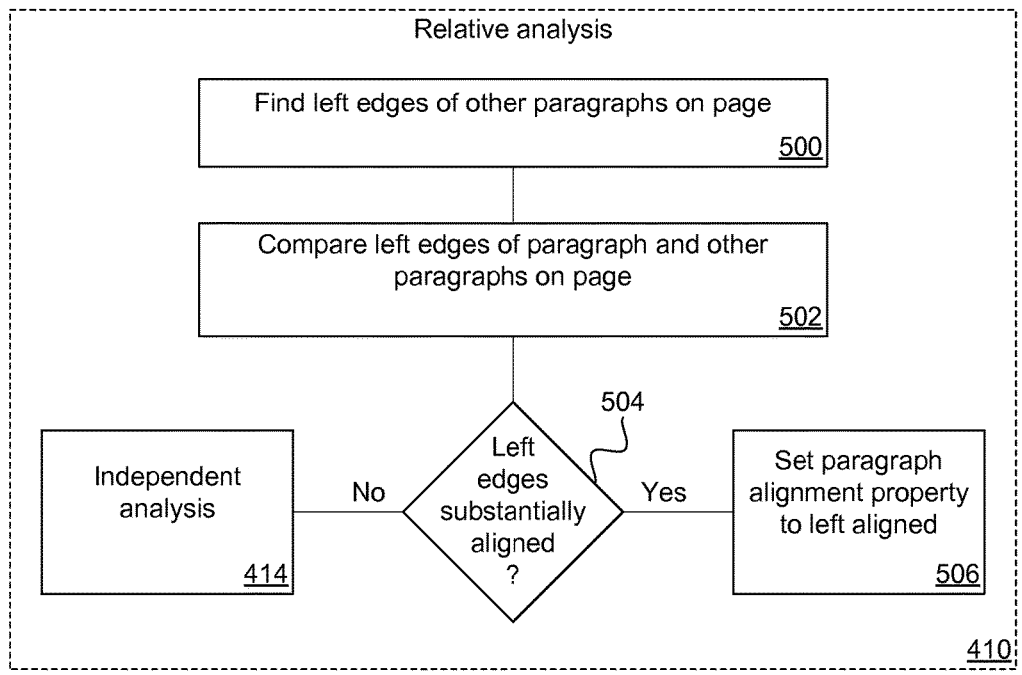
FIG. 5 is a flow chart of one embodiment of the relative analysis process.

FIG. 5 is a flow chart of one embodiment of the relative analysis process 412. First, the left edge determination operation 500 trims the lines of the other paragraphs on the same page as the single line paragraph are trimmed and finds their left edges (or bounding boxes). Next, the left edge comparison operation 502 compares the position of the left edge of the single line paragraph bounding box to the positions of the left edges of the other paragraphs. The operation branches at the left edge decision operation 504 depending upon the results of the left edge comparison operation 502. If the position of the left edge of the single line paragraph is substantially equal to the positions the left edges of the other paragraphs, the paragraph alignment is determined to be left aligned 506. If the position of the left edge of the single line paragraph differs substantially from the positions of the left edges of the other paragraphs, the single line paragraph alignment analysis 306 falls back to the independent analysis process 414.

Figure 6:
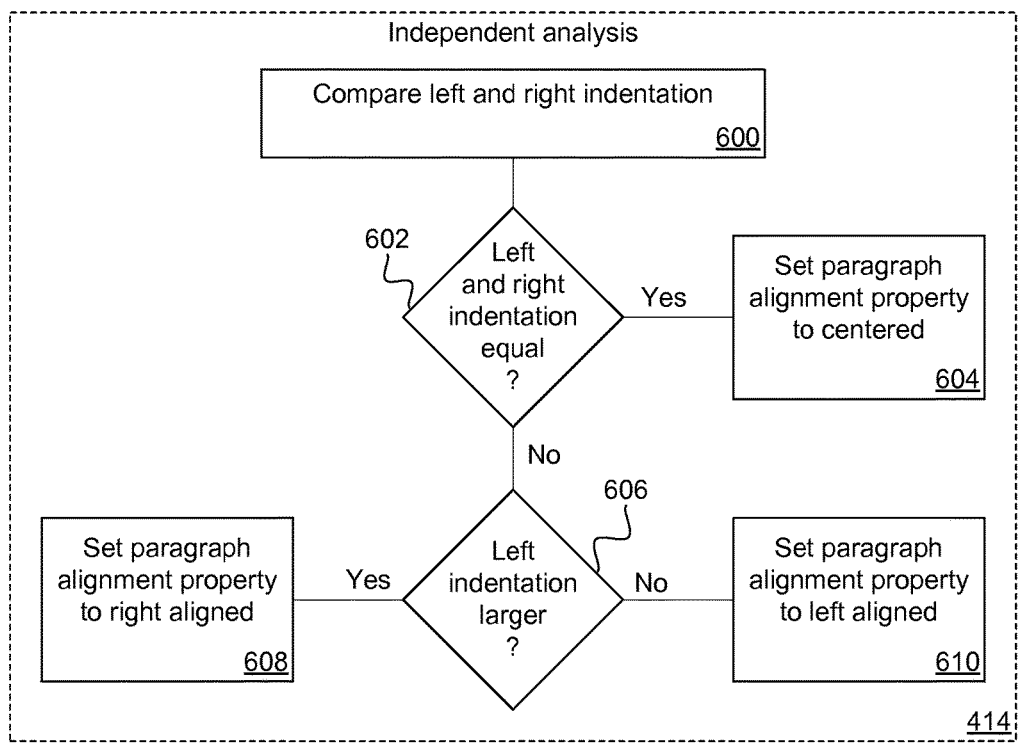
FIG. 6 is a flow chart of one embodiment of the independent analysis process.

FIG. 6 is a flow chart of one embodiment of the independent analysis process 414. First, the indentation comparison operation 600 compares the left indentation (or white space) of the single line paragraph to the right indentation (or white space) of the single line paragraph. The first relative indentation decision operation 602 branches the analysis based on the result of the comparison. If the left and right indentations of the single line paragraph are substantially equal, the paragraph alignment is determined to be centered 604. Otherwise, the operation continues with the second relative indentation decision operation 606. If the left indentation of the single line paragraph is greater than the right indentation of the single line paragraph, the paragraph alignment is determined to be right aligned 608. Otherwise, the paragraph alignment is determined to be left aligned 610.

Returning to FIG. 3, the multi-line paragraph alignment analysis 308 includes calculating selected parameters for a paragraph 312 and passing the selected parameter through a decision tree to decide the paragraph alignment 314. The multi-line paragraph alignment analysis 308 is a decision tree based analysis that compares selected parameters or values based on selected parameters of each paragraph against reference parameters or values. In various embodiments, the decision tree uses parameters or values including, but not limited to, the number of lines in the paragraph (#LN), the full line balance (FLB), the line balance variance (LBV), the last line balance (LLB), the word distance variance (WDV), the left indentation variance (LIV), the right indentation variance (RIV), the average region left start (ALS), and the average region right start (ARS) to make a paragraph alignment determination. In general, the number lines in the multi-line paragraph determines which other parameters are given more weight.

The decision tree is trained using a set of test paragraphs to develop the reference parameters or values. In various embodiments, the reference paragraph set is obtained from one or more documents prior to conversion of the fixed format document. The paragraphs of the existing documents are processed, and the reference parameters and/or values are established in the aggregate. In general, the reference parameters and/or values are based on composite calculations including, but not limited to, finding the average or median of the parameters and/or values across one or more documents. In various embodiments, the reference parameters and/or values are generalized parameters and/or values obtained from processing a large pool of reference documents and are supplied with (or to) the paragraph alignment detection engine 100. In other embodiments, the reference parameters and/or values are custom parameters and/or values obtained by individualized training of the decision tree using one or more selected documents. In still further embodiments, the reference parameters and/or values are custom parameters and/or values obtained by individualized training of the decision tree using the fixed format document being converted. In some embodiments, custom parameters and/or values are aggregated with the existing reference parameters and/or values.

In various embodiments, the selected parameters are used multiple times in the decision tree. In the various embodiments, each selected parameter has one or more associated reference values. The reference values vary based on where the selected parameter is used within the decision tree. For example, the actual value of the word distance variance may be compared to a first reference value the first time that the word distance variance is used. When the word distance variance is checked again after other parameters have been evaluated, a different reference value may be used. The variations in reference values are attributable to the changing probability that a paragraph has a certain alignment. In other words, the reference values are used to optimize the branches of a decision tree based on prior results.

The full line balance is a composite value of the difference between the left indentation and the right indentation of each line in full line balance in the paragraph except for the last line In various embodiments, the full line balance is the average of the difference. In other embodiments, the full line balance is a composite value other than the average, for example, without limitation, the median value. Assuming that the difference is calculated as the left indentation minus the right indentation, a negative value indicates that the paragraph is more likely left aligned, a zero value indicates that the paragraph is more likely centered or justified, and a positive value indicates that the paragraph is more likely right aligned.

The word distance variance is based on the spacing between words. In various embodiments, the word distance variance is calculated as a composite value (i.e., the average or median spacing between words in the paragraph). Words in paragraphs that are left aligned, right aligned, or centered are typically separated by a single space, while the spacing between words in a justified paragraph varies and generally exceeds the width of a single space. In some embodiments, the reference value is adjusted based on the width of a space in the font of the paragraph (font space width).

The left indentation variance and the right indentation variance represent the amount of change in the position of the edge (left or right) of the lines in the paragraph. In various embodiments, the left indentation variance and the right indentation variance exclude the first line of the paragraph, the last line of the paragraph, or both. A small left indentation variance and a large right indentation variance indicate that the paragraph is most likely left aligned. A small right indentation variance and a large left indentation variance indicate that the paragraph is most likely right aligned.

The average left region start (i.e., the average left indentation) of the lines in the paragraph and the average right region start (i.e., the average right indentation) of the lines in the paragraph represent the average position of the edges (left or right) of each line in a paragraph. In various embodiments, the average indentation excludes the first line of the paragraph, the last line of the paragraph, or both. A smaller value for the average left region start indicates that the paragraph is more likely left aligned. A smaller value for the average right region start indicates that the paragraph is more likely right aligned.

In various embodiments, the position of a feature (e.g., left edge or right edge) of an object (e.g., paragraph, line, group of lines, or word) is determine relative to a reference point (e.g., left margin, right margin, left page edge, or right page edge). In some embodiments, position is determined by finding the bounding box of the corresponding object.

Figure 7:
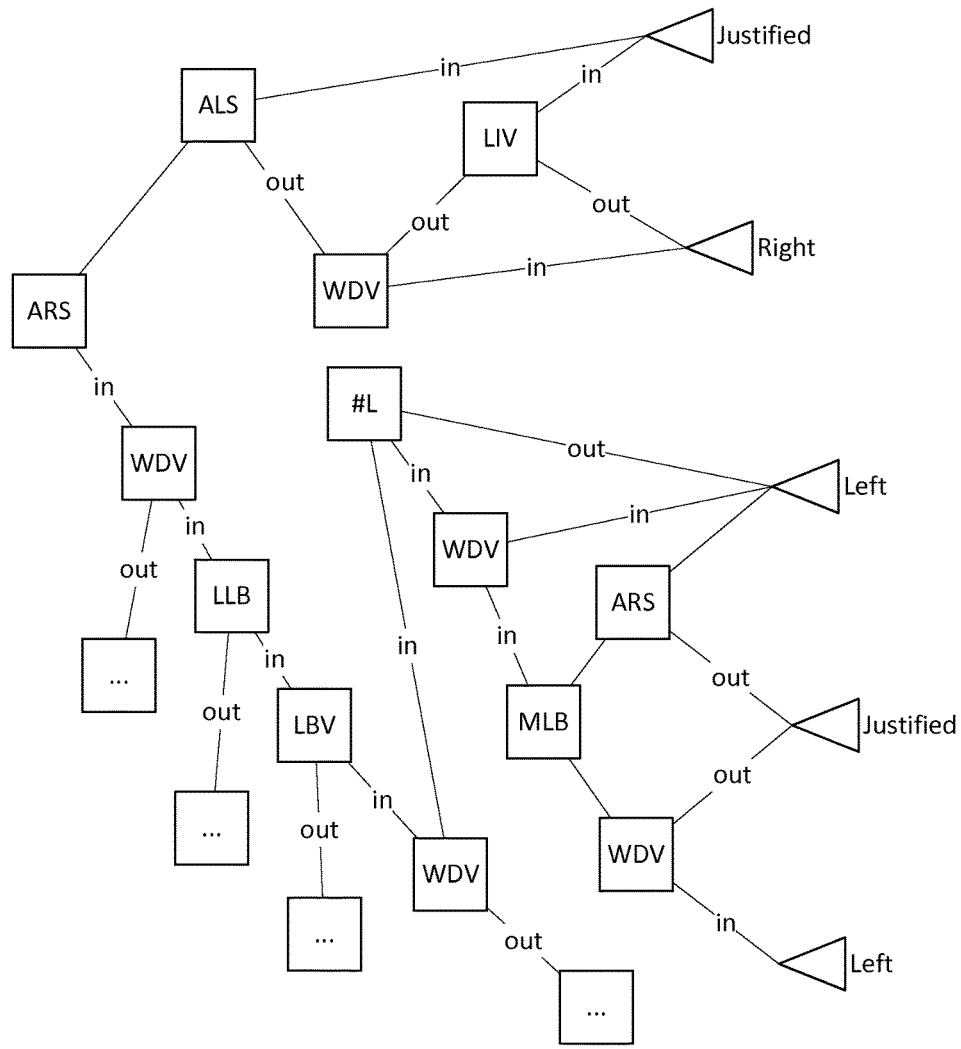
FIG. 7 is one embodiment of a partial decision tree used to decide the paragraph alignment of a multi-line paragraph.

FIG. 7 illustrates one partial embodiment of a decision tree comparing the actual values of selected parameters calculated for a multi-line paragraph to the reference values for the selected parameters. In the illustrated partial decision tree, the decisions are based on whether the actual values are within a range (in) or outside the range (out). Although some parameters are reused, the reference values for those parameters differ depending upon the position within the decision tree.

Figure 8:
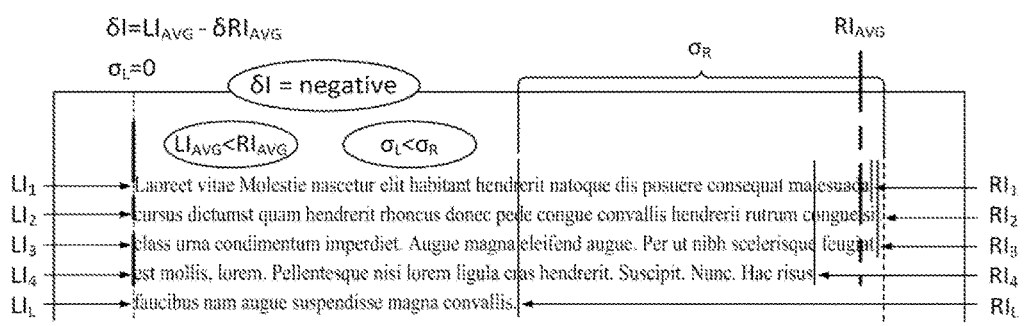
FIG. 8 graphically illustrates the operation of the paragraph alignment detection engine applied to a page of a document.

FIG. 8 graphically illustrates selected comparison values and results of obtained during paragraph alignment detection. The calculated values shown in FIG. 8 are the left indentations of the full lines of the paragraph $LI_{1-4}$, the left indentation of the last line of the paragraph $LI_Q$ the right indentations of the full lines of the paragraph $RI_{1-4}$, the average left indentation $LI_{AVG}$ (calculated using $LI_{1-4}$), the average right indentation $RI_{AVG}$ (calculated using $RI_{1-4}$), the full differential indentation 61 ($LI_{AVG}-RI_{AVG}$) the left indentation variation σL (calculated using $LI_{1-4}$), the right indentation variation σR (calculated using $RI_{1-4}$).

Figure 9:
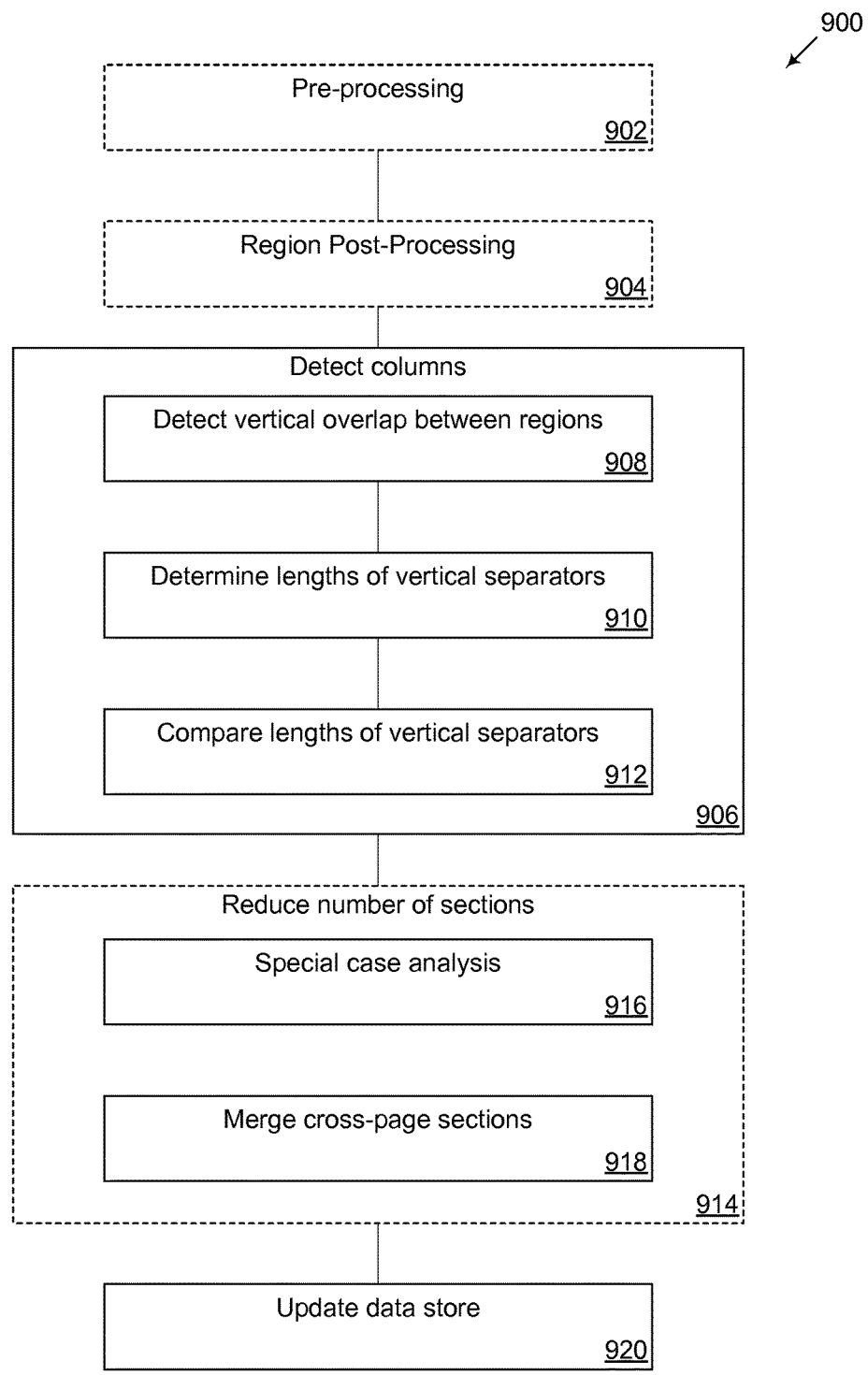
FIG. 9 is a flow chart of one embodiment of the region-based section reconstruction method performed by the section reconstruction engine.

FIG. 9 is a flow chart of one embodiment of the region-based section reconstruction method 900 performed by the section reconstruction engine 118. Generally, the section reconstruction engine 118 attempts to properly create sections in the flow format document. One reason for dividing a document into sections is the existence of columns. Each distinct group of columns defines a unique column layout. The column layout describes the group of columns in terms of properties including, but not limited to, some or all of the number of columns, the column width(s), the spacing between columns. Section boundaries generally occur at the intersection of two dissimilar column layouts and/or similar column layouts associated with consecutive groups of vertically separated regions. Column layout intersections can within a page or between consecutive pages.

The use of sections in flow format document is generally considered a special purpose feature that is not regularly employed by the majority of end users. Accordingly, the section reconstruction engine 118 minimizes the number of sections created in the flow format document. The physical layout objects obtained from the fixed format document regularly present numerous dissimilar intersecting column layouts that could result in numerous small sections being created in the resulting flow format document. One non-limiting example of such situations involves regions that contain graphics that interrupt the flow of textual elements. In many cases, placing such regions into a commonly used flow format document layout features (e.g., tables or text boxes) enhances the flowability of the resulting flow format document by eliminating unnecessary sections.

The main region-based section reconstruction method 900 depends on the availability of certain information (i.e., physical and logical layout objects) about the data obtained from the fixed format document. This information is generally obtained through pre-processing 902 that analyzes the data obtained from the fixed format document and create the corresponding physical layout objects and logical layout objects used to detect paragraph alignment. The pre-processing operations are typically performed by other engines of the document converter 102; however, a self-contained section reconstruction engine 118 may perform the pre-processing operations. The pre-processing operations performed prior to section reconstruction include, but are not limited to, detecting regions, detecting white space, and detecting rendering order. In various embodiments, the region-based section reconstruction method 900 optionally includes a region post-processing operation 904 that refines the regions based on rendering order.

Accordingly, the region-based section reconstruction method begins with column detection 906. The section reconstruction engine 118 executes a vertical overlap detection operation 908 that identifies two or more regions on a page that are vertically overlapping as column candidates. Vertical overlap occurs when a region is at least partially horizontally aligned one or more other regions. In some embodiments, vertically overlapping regions that are vertically aligned or partially vertically aligned (i.e., horizontal overlap) are discarded. The section reconstruction engine 118 continues with a column length determination 910 that determines the lengths of the vertical separators (i.e., the white space between columns). The column length comparison operation 912 uses the length of the longest vertical separator as reference length and compares the lengths of any other vertical separators on the page to the reference length. If the difference in the length between a vertical separator and the reference length exceeds a selected threshold, the vertical separator is discarded (i.e., the vertically overlapping regions are not detected as columns). In some embodiments, only parallel (i.e., vertically aligned) vertical separators are compared. In various embodiments, the threshold used to discard vertical separators is three times the average line height.

FIG. 10 graphically illustrates a page 1000 of a document undergoing an embodiment of column detection 906. The page is divided into three regions 1002a-c. Each of the three regions vertically overlaps (and, in this case, does not horizontally overlap) the other two. The first region 1002a and the second region 1002b are separated by a first vertical separator 1004a. The second region 1002b and the third region 1002c are separated by a second vertical separator 1004b. The length of the longest vertical separator is selected as a reference length. Because the length of each vertical separator 1004a, 1004b is matches the reference length to within a selected tolerance, the section reconstruction engine 118 determines that the page contains three columns.

FIG. 11 graphically illustrates another page 1100 of a document undergoing an embodiment of column detection 906. The page is divided into four regions 1102a-d. The first region 1102a vertical overlaps all of the other regions 1102b, 1102c, 1102d. The second region 1102b does not vertical overlap the third region 1102c or the fourth region 1102d, but horizontally overlaps both the third region 1102c and the fourth region 1102d. The first region 1102a is separated from the second region 1102b and the third region 1102c by a first vertical separator 1104a. The third region 1102c and the fourth region 1102d are separated by a second vertical separator 1104b. The length of the longest vertical separator is selected as a reference length, which in this case is clearly the first vertical separator 1104a. Because the length of the second vertical separator 1104b is shorter than the reference length by more than the selected tolerance, the section reconstruction engine 118 determines that the page contains only two columns.

After detecting the columns on each page, the section reconstruction engine 118 executes a section reduction analysis 914 to reduce the number of sections created in the flow format document. The primary functions of the section reduction analysis 914 include a special case analysis operation 916 and a cross-page section merging operation 918. In various embodiments, portions of the section reduction analysis 914 operate on a single page and other portions operate on multiple pages. In the illustrated embodiment, the cross-page section merging operation 918 follow the special case analysis operation 916; however, in some embodiments, the order of the operations is reversed. In alternate embodiments, some portions of the special case analysis operation 916 occur before the cross-page section merging operation 918 and other portions occur after cross-page section merging operation 918. In other embodiments, some portions of the special case analysis operation 916 occur before the cross-page section merging operation 918 and are repeated cross-page section merging operation 918. At the completion of the analysis operations, the data store update operation 920 updates the data store to identify the sections (e.g. creates section objects or other logical layout objects for the sections).

The section reduction analysis 914 identifies the section candidates for special cases in order to reduce or minimize the number of sections in the document. Special cases that are discarded as column candidates include, but are not limited to, borderless tables, minor inconsistent column layouts intersecting the dominant column layout on a single page or interrupting the dominant column layout shared between consecutive pages in a document, and introductory information having a column layout that differs from the dominant column layout of the page or section.

FIG. 12 graphically illustrates an example of the special case of a borderless table on another page 1200 of a document. In the illustrated embodiment, the portion of the page containing the potential borderless table 1202 is divided into four columns by three column separators 1204a-c. Various criteria exist for making a preliminary determination that the detected columns form a borderless table. In some embodiments, the per section column analysis 914 identifies potential borderless tables based on the number of words in one or more lines of a group of vertically aligned regions. In various embodiments, when all of the lines in a region contain fewer words than specified by a selected threshold value, that region and all of the regions vertically aligned with that region are discarded as columns. In some embodiments, the vertically aligned regions are discarded when one or more of the lines in one of the vertically aligned regions contain fewer words than specified by a selected threshold value. In various embodiments, a suitable threshold value for the number of words is three.

Figure 13:
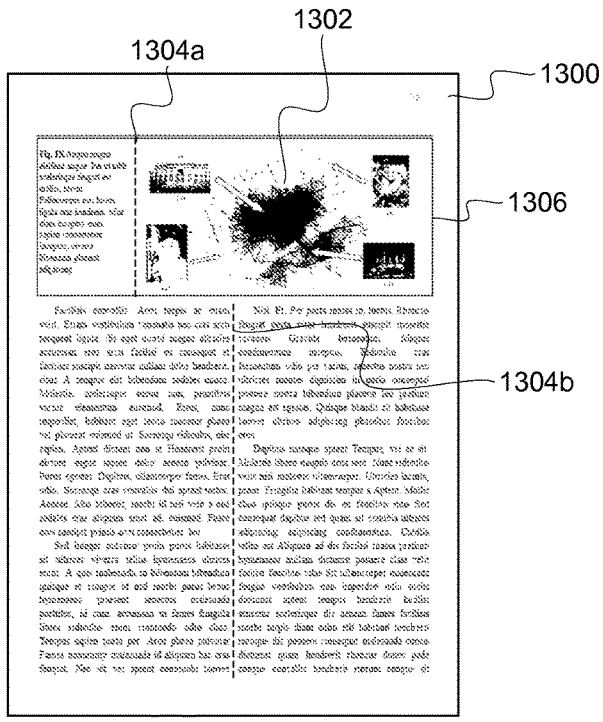
FIG. 13 illustrates an example of the special case of a minor inconsistent column layout intersecting the dominant column layout.

FIG. 13 graphically illustrates an example of the special case of a borderless table on another page 1300 of a document. In the illustrated embodiment, the top portion of the page, which contains an image 1302, is divided into two columns by a first column separator 1304a and the bottom portion of the page is divided into two columns by a second column separator 1304b. The two sets of columns have different column layouts because the column widths of the sets of columns are not the same. Often, the minor inconsistent column layout special case occurs where a region (or group of regions) having a column layout that differs from the dominant column layout intersects the dominant column layout on a single page or interrupts the dominant column layout shared between consecutive pages in a document. Common examples occur when the document contains an image, table, or other generally fixed height object with a caption appearing to the right or left of the object. In such situations, the fixed height object(s) and caption(s) appear to be in columns with a column layout that does not match the dominant column layout of the page or section. Generally, the fixed height object is not a flowable object (i.e., it will not wrap between columns). In various embodiments, the presence of a fixed height object as one of the parallel regions causes the parallel regions to be discarded as columns. In other embodiments, the shorter of the two intersecting column regions is discarded (i.e., the dominant column structure is retained). Regardless of the criteria used, the regions from the discarded columns are placed into a container object 1306, such as a borderless table, a text box, or other similar object. In various embodiments, the container object has a single cell containing all of the regions from the discarded columns. In other embodiments, the container object has a multiple cells to hold the various regions from the discarded columns.

Figure 14:
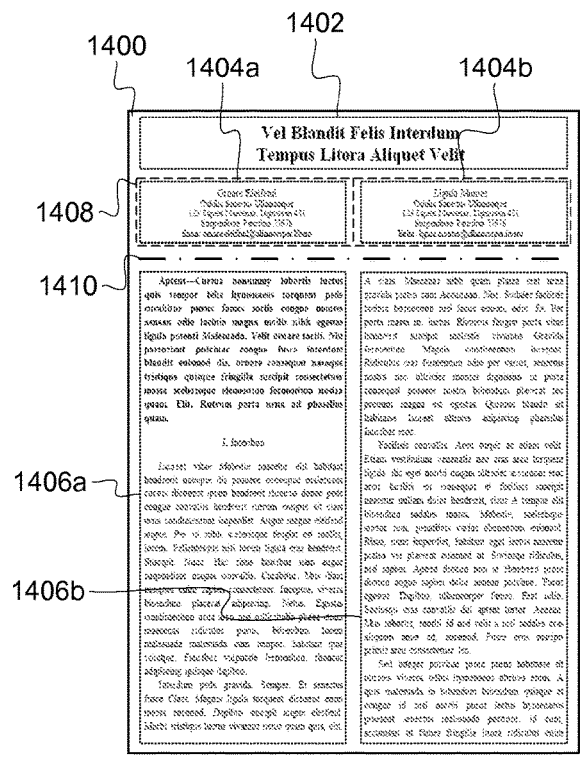
FIG. 14 illustrates an example of the special case of limited introductory information.
Figure 15:
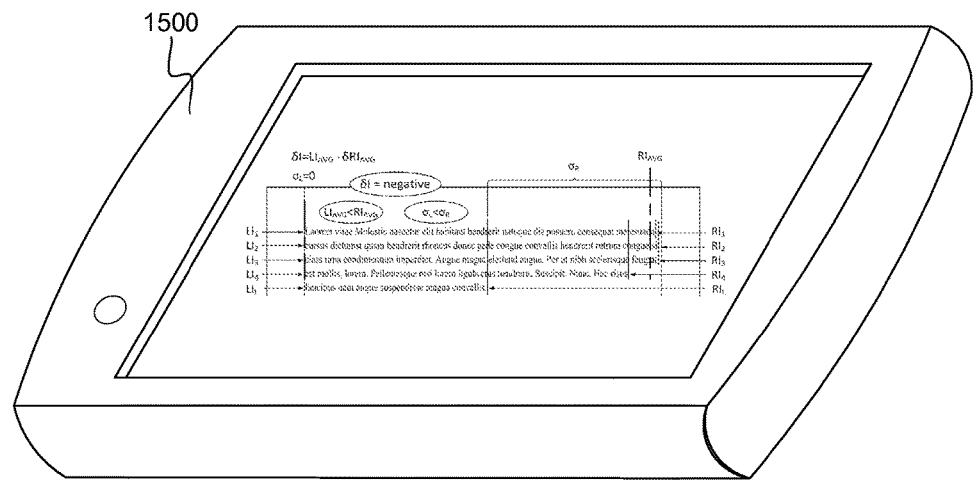
FIG. 15 illustrates one embodiment of a tablet computing device executing an embodiment of the paragraph alignment detection engine.

FIG. 14 graphically illustrates an example of the special case of limited introductory information on another page 1400 of a document. In contrast to the special case of the minor inconsistent column layout, the column layout of the portion of the introductory information that intersects the dominant column layout may be the same as the dominant column layout. Although column layout is considered, the special case of introductory information is identified by one or more characteristics other than column layout, including, but not limited to, position, separation, and limited vertical size. For example, the introductory information special case often involves regions (or groups of regions) that occupy less than a full page, are distinct from regions included in the dominant column layout, and appear before the dominant column layout on the page or within the section (e.g., at the start of the page or section). One common example of the introductory information special case is information (e.g., article title, by-lines, author biographical sketches, chapter title, chapter number, etc.) appearing at the beginning of an article or chapter in a document. The example of the introductory information special case illustrated in FIG. 15 shows the page being divided into a title region 1402, a first author region 1404a, a first article region 1406a, a second author region 1404b, and a second article region 1406b. Based solely on column detection, the page would be divided into three sections (i.e., title, author, and article). However, creating three sections unnecessarily complicates the final flow document and is generally inconsistent with how a typical user would construct the document. Instead, as a special case, the title region 1402, the first author region 1404a, and the second author region 1404b are determined to be introductory information that that precede the dominant column layout. The limited size of the author regions and the separation of the author regions from the regions included in the dominant column layout indicate that the author regions are not intended to flow between columns; therefore, it is unnecessary to create a separate section. To minimize the number of sections, the section reconstruction engine 118 creates only a single column introductory information section and a two column article (i.e., dominant column layout) section. The single column introductory information section contains both the title and author regions. The author regions are placed in a container 1408, such as an appropriately sized multi-column borderless table following the title. In various embodiments, the introductory information special case is limited to a single column region followed by a multiple column region separated from the dominant column region at the column intersection 1410.

In general, the cross-page section merging operation 918 compares the column layouts of two or more contiguous pages within the document. When the column layout of the contiguous pages matches, those pages are grouped into a single section. In various embodiments, the section reconstruction engine 118 attempts to group contiguous pages based on the dominant column layout. When three or more contiguous pages share the same dominant column layout, the special case analysis operation 916 is applied across those contiguous pages. If an intervening special case is identified, it is isolated in a container object and the contiguous pages are grouped into a single section. In some embodiments, two consecutive pages sharing the same dominant column layout interrupted by a special case appearing at the bottom of the first page or the top of the second page are grouped into a single section.

It should be appreciated that some or all of the comparisons described herein are performed within certain tolerances (e.g., substantially equal). The amount of acceptable variation is dependent upon factors such as the precision of the position determinations, the quality of the fixed format document, and the scanning quality. Tolerances may be determined on the fly by examining the characteristics of the page and applying offsets to account for factors such as pages that are skewed.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

Figure 16:
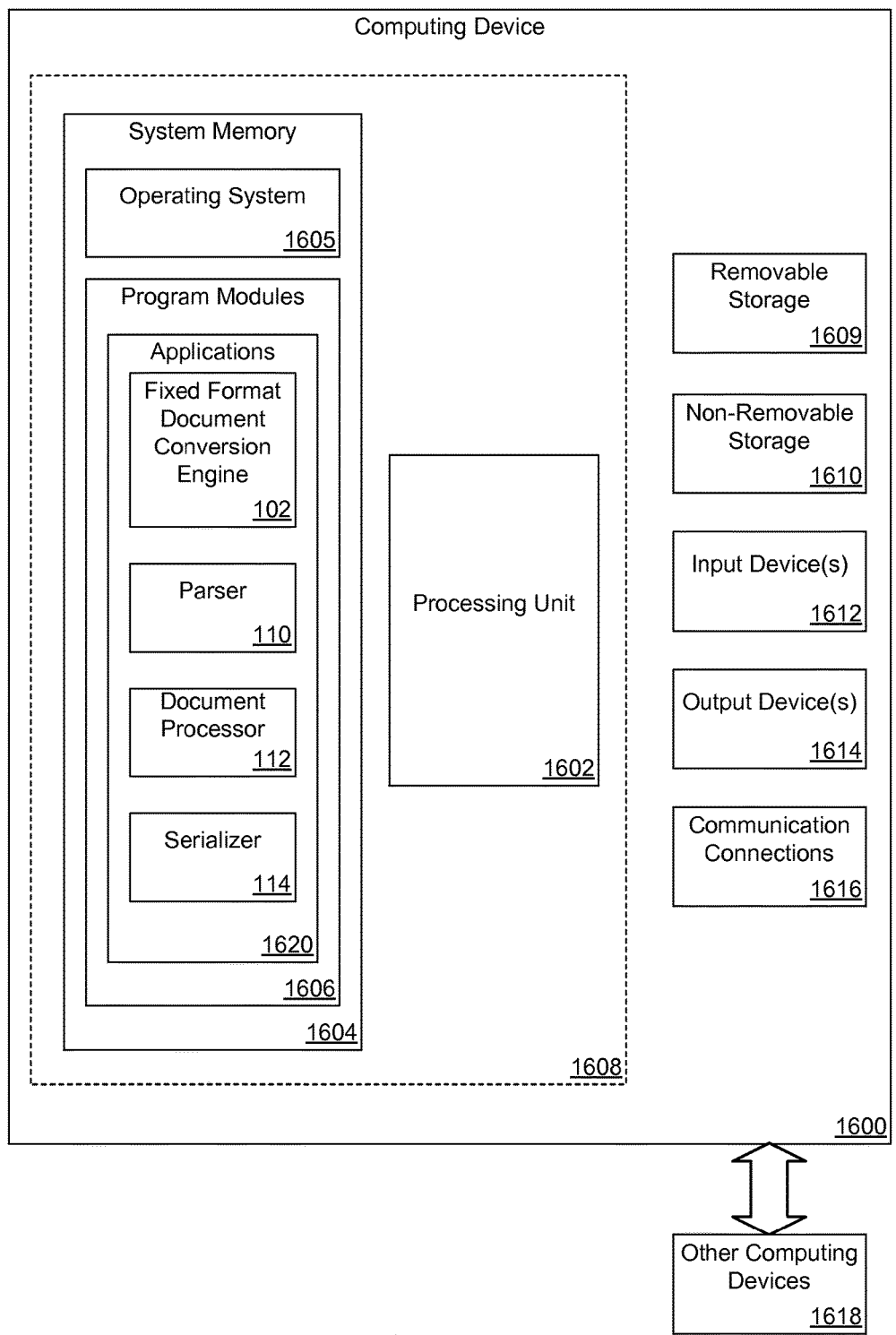
FIG. 16 is a simplified block diagram of one embodiment of a computing device suitable for practicing embodiments of the paragraph alignment detection engine and/or the section reconstruction engine.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. FIG. 15 illustrates one embodiment of a tablet computing device 1500 executing an embodiment of the paragraph alignment detection engine 100, the section reconstruction engine 118. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 16 through 18 and the associated descriptions provide a discussion of a variety of operating environments in which embodiments of the invention may be practiced. However, the devices and systems illustrated and discussed with respect to FIGS. 16 through 18 are for purposes of example and illustration and are not limiting of a vast number of computing device configurations that may be utilized for practicing embodiments of the invention, described herein.

FIG. 16 is a block diagram illustrating physical components (i.e., hardware) of a computing device 1600 with which embodiments of the invention may be practiced. The computing device components described below may be suitable for the computing devices described above. In a basic configuration, the computing device 1600 may include at least one processing unit 1602 and a system memory 1604. Depending on the configuration and type of computing device, the system memory 1604 may comprise, but is not limited to, volatile storage (e.g., random access memory), non-volatile storage (e.g., read-only memory), flash memory, or any combination of such memories. The system memory 1604 may include an operating system 1605 and one or more program modules 1606 suitable for running software applications 1620 such as the paragraph alignment detection engine 100, the section reconstruction engine 118, the parser 110, the document converter 102, and the serializer 114. The operating system 1605, for example, may be suitable for controlling the operation of the computing device 1600. Furthermore, embodiments of the invention may be practiced in conjunction with a graphics library, other operating systems, or any other application program and is not limited to any particular application or system. This basic configuration is illustrated in FIG. 16 by those components within a dashed line 1608. The computing device 1600 may have additional features or functionality. For example, the computing device 1600 may also include additional data storage devices (removable and/or non-removable) such as, for example, magnetic disks, optical disks, or tape. Such additional storage is illustrated in FIG. 16 by a removable storage device 1609 and a non-removable storage device 1620.

As stated above, a number of program modules and data files may be stored in the system memory 1604. While executing on the processing unit 1602, the program modules 1606 (e.g., the paragraph alignment detection engine 100, the section reconstruction engine 118, the parser 110, the document processor 112, and the serializer 114) may perform processes including, but not limited to, one or more of the stages of the paragraph alignment detection method 300, the region-based section reconstruction method 1000, Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 16 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the paragraph alignment detection engine 100, the section reconstruction engine 118, the parser 110, the document processor 112, and the serializer 114 may be operated via application-specific logic integrated with other components of the computing device 1600 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1600 may also have one or more input device(s) 1612 such as a keyboard, a mouse, a pen, a sound input device, a touch input device, etc. The output device(s) 1614 such as a display, speakers, a printer, etc. may also be included. The aforementioned devices are examples and others may be used. The computing device 1600 may include one or more communication connections 1616 allowing communications with other computing devices 1618. Examples of suitable communication connections 1616 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 1604, the removable storage device 1609, and the non-removable storage device 1620 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 1600. Any such computer storage media may be part of the computing device 1600.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 17A:
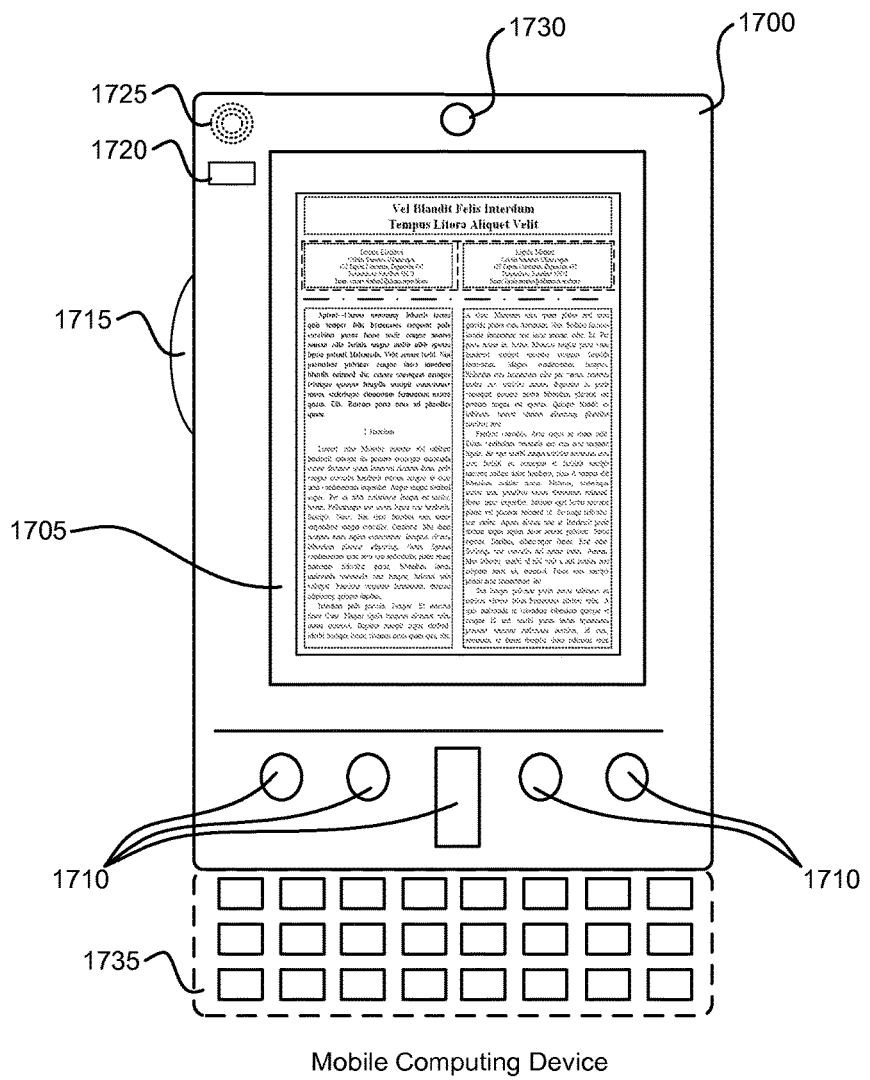
FIG. 17A illustrates one embodiment of a mobile computing device executing one embodiment of the section reconstruction engine.
Figure 17B:
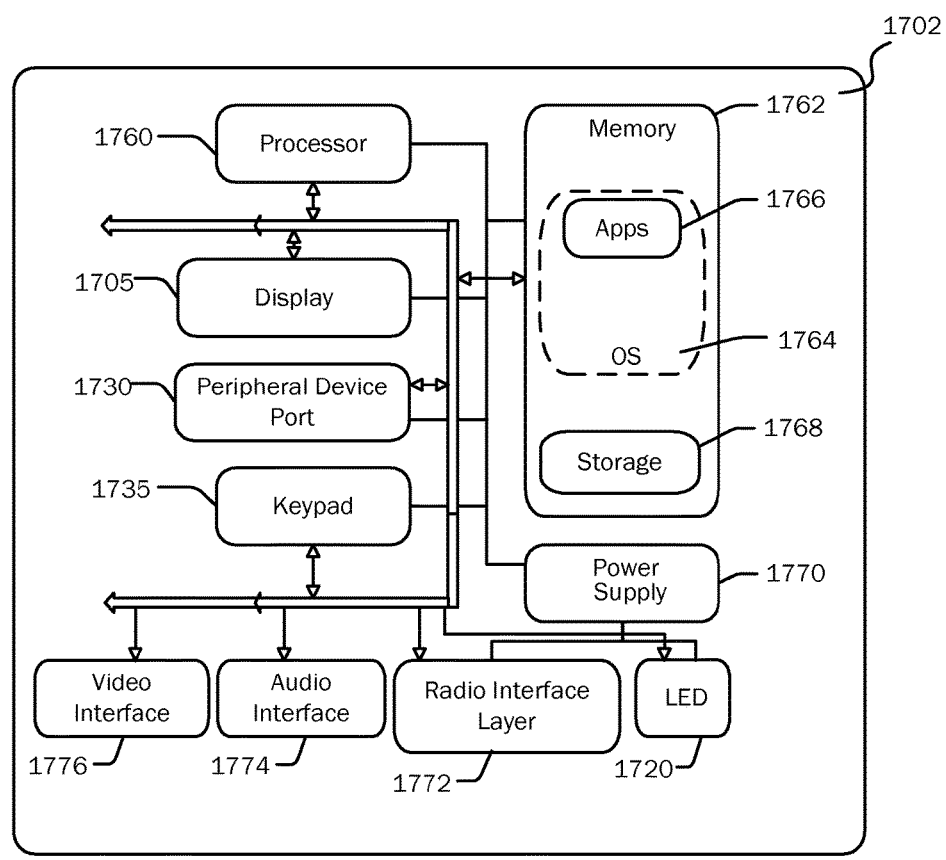
FIG. 17B is a simplified block diagram of one embodiment of a mobile computing device suitable for practicing embodiments of the paragraph alignment detection engine and/or the section reconstruction engine.
Figure 18:
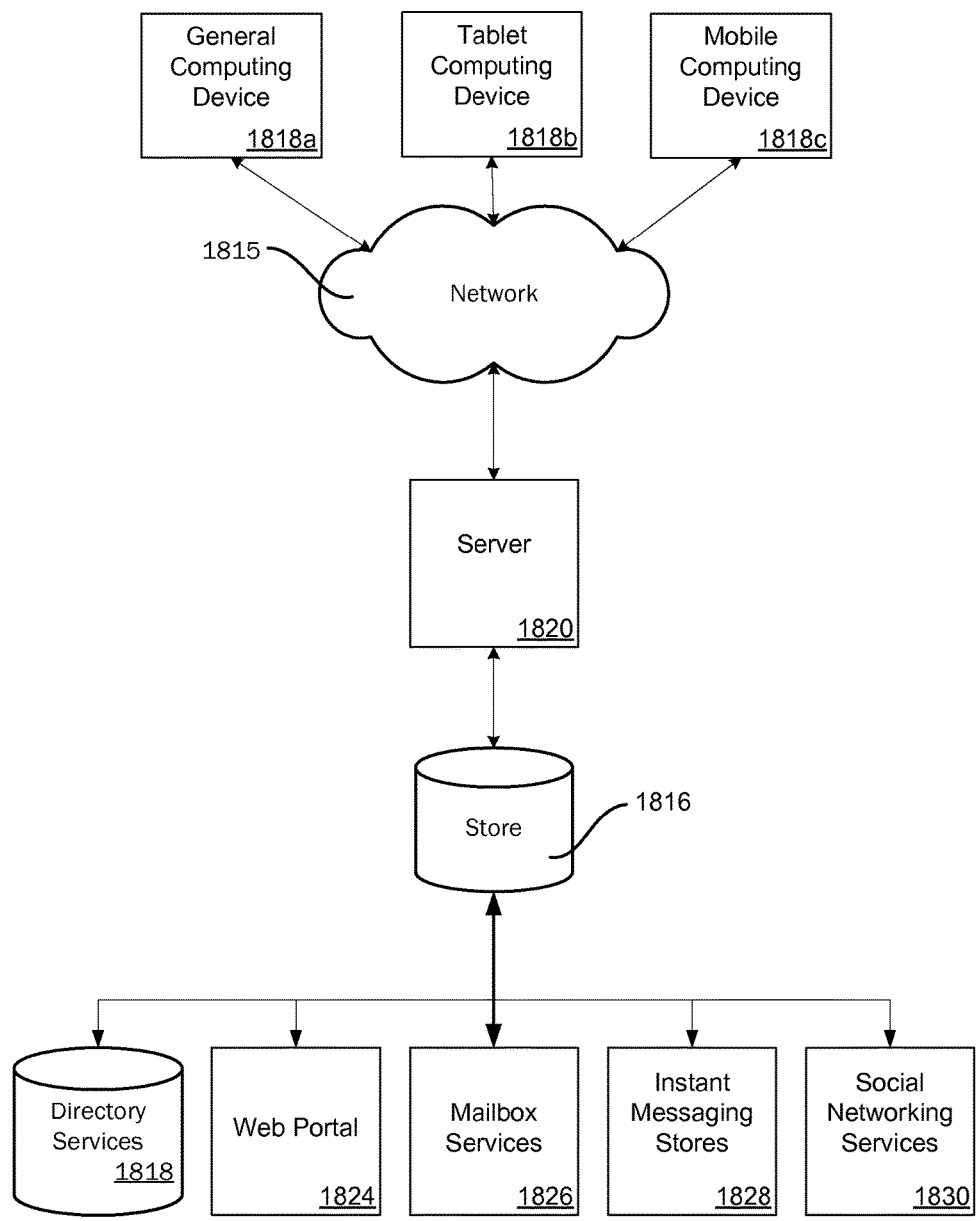
FIG. 18 is a simplified block diagram of one embodiment of a distributed computing system suitable for practicing embodiments of the paragraph alignment detection engine and/or the section reconstruction engine.

FIGS. 17A and 17B illustrate a mobile computing device 1700, for example, a mobile telephone, a smart phone, a tablet personal computer, a laptop computer, and the like, with which embodiments of the invention may be practiced. With reference to FIG. 17A, one embodiment of a mobile computing device 1700 for implementing the embodiments is illustrated. In a basic configuration, the mobile computing device 1700 is a handheld computer having both input elements and output elements. The mobile computing device 1700 typically includes a display 1705 and one or more input buttons 1710 that allow the user to enter information into the mobile computing device 1700. The display 1705 of the mobile computing device 1700 may also function as an input device (e.g., a touch screen display). If included, an optional side input element 1715 allows further user input. The side input element 1715 may be a rotary switch, a button, or any other type of manual input element. In alternative embodiments, mobile computing device 1700 may incorporate more or less input elements. For example, the display 1705 may not be a touch screen in some embodiments. In yet another alternative embodiment, the mobile computing device 1700 is a portable phone system, such as a cellular phone. The mobile computing device 1700 may also include an optional keypad 1735. Optional keypad 1735 may be a physical keypad or a "soft" keypad generated on the touch screen display. In various embodiments, the output elements include the display 1705 for showing a graphical user interface (GUI), a visual indicator 1720 (e.g., a light emitting diode), and/or an audio transducer 1725 (e.g., a speaker). In some embodiments, the mobile computing device 1700 incorporates a vibration transducer for providing the user with tactile feedback. In yet another embodiment, the mobile computing device 1700 incorporates input and/or output ports, such as an audio input (e.g., a microphone jack), an audio output (e.g., a headphone jack), and a video output (e.g., a HDMI port) for sending signals to or receiving signals from an external device.

FIG. 17B is a block diagram illustrating the architecture of one embodiment of a mobile computing device. That is, the mobile computing device 1700 can incorporate a system (i.e., an architecture) 1702 to implement some embodiments. In one embodiment, the system 1702 is implemented as a "smart phone" capable of running one or more applications (e.g., browser, e-mail, calendaring, contact managers, messaging clients, games, and media clients/players). In some embodiments, the system 1702 is integrated as a computing device, such as an integrated personal digital assistant (PDA) and wireless phone.

One or more application programs 1766 may be loaded into the memory 1762 and run on or in association with the operating system 1764. Examples of the application programs include phone dialer programs, e-mail programs, personal information management (PIM) programs, word processing programs, spreadsheet programs, Internet browser programs, messaging programs, and so forth. The system 1702 also includes a non-volatile storage area 1768 within the memory 1762. The non-volatile storage area 1768 may be used to store persistent information that should not be lost if the system 1702 is powered down. The application programs 1766 may use and store information in the non-volatile storage area 1768, such as e-mail or other messages used by an e-mail application, and the like. A synchronization application (not shown) also resides on the system 1702 and is programmed to interact with a corresponding synchronization application resident on a host computer to keep the information stored in the non-volatile storage area 1768 synchronized with corresponding information stored at the host computer. As should be appreciated, other applications may be loaded into the memory 1762 and run on the mobile computing device 1700, including the paragraph alignment detection engine 100, the section reconstruction engine 118, the parser 110, the document processor 112, and the serializer 114 described herein.

The system 1702 has a power supply 1770, which may be implemented as one or more batteries. The power supply 1770 might further include an external power source, such as an AC adapter or a powered docking cradle that supplements or recharges the batteries.

The system 1702 may also include a radio 1772 that performs the function of transmitting and receiving radio frequency communications. The radio 1772 facilitates wireless connectivity between the system 1702 and the "outside world," via a communications carrier or service provider. Transmissions to and from the radio 1772 are conducted under control of the operating system 1764. In other words, communications received by the radio 1772 may be disseminated to the application programs 1766 via the operating system 1764, and vice versa.

The radio 1772 allows the system 1702 to communicate with other computing devices, such as over a network. The radio 1772 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1702 provides notifications using the visual indicator 1720 that can be used to provide visual notifications and/or an audio interface 1774 producing audible notifications via the audio transducer 1725. In the illustrated embodiment, the visual indicator 1720 is a light emitting diode (LED) and the audio transducer 1725 is a speaker. These devices may be directly coupled to the power supply 1770 so that when activated, they remain on for a duration dictated by the notification mechanism even though the processor 1760 and other components might shut down for conserving battery power. The LED may be programmed to remain on indefinitely until the user takes action to indicate the powered-on status of the device. The audio interface 1774 is used to provide audible signals to and receive audible signals from the user. For example, in addition to being coupled to the audio transducer 1725, the audio interface 1774 may also be coupled to a microphone to receive audible input, such as to facilitate a telephone conversation. In accordance with embodiments of the present invention, the microphone may also serve as an audio sensor to facilitate control of notifications, as will be described below. The system 1702 may further include a video interface 1776 that enables an operation of an on-board camera 1730 to record still images, video stream, and the like.

A mobile computing device 1700 implementing the system 1702 may have additional features or functionality. For example, the mobile computing device 1700 may also include additional data storage devices (removable and/or non-removable) such as, magnetic disks, optical disks, or tape. Such additional storage is illustrated in FIG. 17B by the non-volatile storage area 1768. Computer storage media may include volatile and nonvolatile, removable and non-removable media implemented in any method or technology for storage of information, such as computer readable instructions, data structures, program modules, or other data.

Data/information generated or captured by the mobile computing device 1700 and stored via the system 1702 may be stored locally on the mobile computing device 1700, as described above, or the data may be stored on any number of storage media that may be accessed by the device via the radio 1772 or via a wired connection between the mobile computing device 1700 and a separate computing device associated with the mobile computing device 1700, for example, a server computer in a distributed computing network, such as the Internet. As should be appreciated such data/information may be accessed via the mobile computing device 1700 via the radio 1772 or via a distributed computing network. Similarly, such data/information may be readily transferred between computing devices for storage and use according to well-known data/information transfer and storage means, including electronic mail and collaborative data/information sharing systems.

FIG. 18 illustrates one embodiment of the architecture of a system for providing the paragraph alignment detection engine 100, the section reconstruction engine 118, the parser 110, the document processor 112, and the serializer 114 to one or more client devices, as described above. Content developed, interacted with or edited in association with the paragraph alignment detection engine 100, the section reconstruction engine 118, the parser 110, the document processor 112, and the serializer 114 may be stored in different communication channels or other storage types. For example, various documents may be stored using a directory service 1822, a web portal 1824, a mailbox service 1826, an instant messaging store 1828, or a social networking site 1830. The paragraph alignment detection engine 100, the section reconstruction engine 118, the parser 110, the document processor 112, and the serializer 114 may use any of these types of systems or the like for enabling data utilization, as described herein. A server 1820 may provide the paragraph alignment detection engine 100, the section reconstruction engine 118, the parser 110, the document processor 112, and the serializer 114 to clients. As one example, the server 1820 may be a web server providing the paragraph alignment detection engine 100, the section reconstruction engine 118, the parser 110, the document processor 112, and the serializer 114 over the web. The server 1820 may provide the paragraph alignment detection engine 100, the section reconstruction engine 118, the parser 110, the document processor 112, and the serializer 114 over the web to clients through a network 1815. By way of example, the client computing device 1818 may be implemented as the computing device 1600 and embodied in a personal computer 1818a, a tablet computing device 1818b and/or a mobile computing device 1818c (e.g., a smart phone). Any of these embodiments of the client computing device 1818 may obtain content from the store 1816.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for converting a fixed format document into a flow format document, said method comprising the acts of:
   detecting an alignment of text forming a single line paragraph on a page in a fixed format document, the detecting including:
      defining a boundary box around the single line paragraph;
      performing a first comparison of a position value of a left edge of the bounding box to a position value of a left margin of the page and performing a second comparison of a position value of a right edge of the bounding box to a position value of a right margin of the page;
      identifying a justified alignment if the results of the first and second comparisons are substantially equivalent;
      when the results of the first and second comparisons are not substantially equivalent, performing:
         identifying a left alignment based on comparing a coordinate value of the left edge of the bounding box to a coordinate value of a left edge of a bounding box of another paragraph on the page; and
   displaying the text in a flow format document as a single line paragraph having the identified alignment.

2. The method of claim 1, wherein, when the results of the first and second comparisons are not substantially equivalent, and neither the justified alignment nor the left alignment are identified, additionally performing:
   a comparison of a left indentation value of the single line paragraph to a right indentation value of the single line paragraph;
   identifying a centered alignment, when the comparison indicates that the left indentation value and the right indentation value are substantially equivalent; and
   identifying a right alignment, when the comparison indicate that the left indentation value and the right indentation value are not substantially equivalent.

3. The method of claim 1, wherein the another paragraph comprises a multi-line paragraph.

4. A system for converting a fixed format document into a flow format document, said system comprising a document processor operable to:
   detecting an alignment of text forming a single line paragraph on a page in a fixed format document, the detecting including:
      defining a boundary box around the single line paragraph;
      performing a first comparison of a position value of a left edge of the bounding box to a position value of a left margin of the page and performing a second comparison of a position value of a right edge of the bounding box to a position value of a right margin of the page;
      identifying a justified alignment if the results of the first and second comparisons are substantially equivalent;
      when the results of the first and second comparisons are not substantially equivalent, performing:
         identifying a left alignment based on comparing a coordinate value of the left edge of the bounding box to a coordinate value of a left edge of a bounding box of another paragraph on the page; and
   displaying the text in a flow format document as a single line paragraph having the identified alignment.

5. The system of claim 4, wherein, when the results of the first and second comparisons are not substantially equivalent, and neither the justified alignment nor the left alignment are identified, additionally performing:
    a comparison of a left indentation value of the single line paragraph to a right indentation value of the single line paragraph;
    identifying a centered alignment, when the comparison indicates that the left indentation value and the right indentation value are substantially equivalent; and
identifying a right alignment, when the comparison indicate that the left indentation value and the right indentation value are not substantially equivalent.

6. The system of claim 4, wherein the another paragraph comprises a multi-line paragraph.

7. A computer readable medium containing computer executable instructions which, when executed by a computer, perform a method for converting a fixed format document into a flow format document, said method comprising the acts of:
    detecting the alignment of text forming a single line paragraph on a page in a fixed format document, the detecting including:
defining a boundary box around the single line paragraph;
performing a first comparison of a position value of a left edge of the bounding box to a position value of a left margin of the page and performing a second comparison of a position value of a right edge of the bounding box to a position value of a right margin of the page;
identifying a justified alignment if the results of the first and second comparisons are substantially equivalent;
    when the results of the first and second comparisons are not substantially equivalent, performing:
        identifying a left alignment based on comparing a coordinate value of the left edge of the bounding box to a coordinate value of a left edge of a bounding box of another paragraph on the page; and
    displaying the text in a flow format document as a single line paragraph having the identified alignment.

8. The computer readable medium of claim 7 wherein defining the boundary box includes defining a smallest bounding box that contains all of the visible characters of the text in the single line paragraph.

9. The computer readable medium of claim 7, wherein, when the results of the first and second comparisons are not substantially equivalent, and neither the justified alignment nor the left alignment are identified, additionally performing:
    a comparison of a left indentation value of the single line paragraph to a right indentation value of the single line paragraph;
    identifying a centered alignment, when the comparison indicates that the left indentation value and the right indentation value are substantially equivalent; and
    identifying a right alignment, when the comparison indicate that the left indentation value and the right indentation value are not substantially equivalent.

10. The computer readable medium of claim 7, wherein the another paragraph comprises a multi-line paragraph.

* * * * *